(12) United States Patent
Fill et al.

(10) Patent No.: US 12,528,386 B2
(45) Date of Patent: Jan. 20, 2026

(54) METHOD FOR DETERMINING THE RESPECTIVE TEMPERATURE OF SEVERAL BATTERY CELLS OF A VEHICLE BATTERY VIA EXTRAPOLATION OF A MEASURED TEMPERATURE; CONTROL DEVICE AND VEHICLE BATTERY

(71) Applicant: Mercedes-Benz Group AG, Stuttgart (DE)

(72) Inventors: Alexander Fill, Stuttgart (DE); Arber Avdyli, Reichenbach an der Fils (DE)

(73) Assignee: Mercedes-Benz Group AG, Stuttgart (DE)

( * ) Notice: Subject to any disclaimer, the term of this patent is extended or adjusted under 35 U.S.C. 154(b) by 497 days.

(21) Appl. No.: 18/002,371

(22) PCT Filed: Jun. 8, 2021

(86) PCT No.: PCT/EP2021/065363
§ 371 (c)(1),
(2) Date: Dec. 19, 2022

(87) PCT Pub. No.: WO2022/002539
PCT Pub. Date: Jan. 6, 2022

(65) Prior Publication Data
US 2023/0278464 A1    Sep. 7, 2023

(30) Foreign Application Priority Data
Jun. 29, 2020    (DE) .................... 10 2020 003 887.5

(51) Int. Cl.
*B60L 58/24*    (2019.01)
*B60L 58/18*    (2019.01)
*H01M 10/48*    (2006.01)

(52) U.S. Cl.
CPC ............... *B60L 58/24* (2019.02); *B60L 58/18* (2019.02); *H01M 10/486* (2013.01);
(Continued)

(58) Field of Classification Search
CPC .... B60L 58/24; B60L 58/18; B60L 2240/545; B60L 2240/547; H01M 10/486;
(Continued)

(56) References Cited

U.S. PATENT DOCUMENTS 8,529,125 B2    9/2013    Leutheuser et al.
8,994,340 B2    3/2015    Matthe et al.
(Continued)

FOREIGN PATENT DOCUMENTS

CN         102306941 A  *  8/2011
DE    10 2011 102 360 A1    12/2011
(Continued)

OTHER PUBLICATIONS

PCT/EP2021/065363, International Search Report dated Sep. 23, 2021 (Two (2) pages).
(Continued)

*Primary Examiner* — Tung S Lau
(74) *Attorney, Agent, or Firm* — Crowell & Moring LLP

(57) ABSTRACT

A method for determining respective temperatures of a plurality of battery cells includes determination of measured values including a first voltage of a first battery cell, a second voltage of a second battery cell, and a respective current that flows through the first and second battery cells. A first measured resistance of the first battery cell and a second measured resistance of the second battery cell is determined from the measured values. A reference resistance is determined. A first resistance relationship from the first measured resistance and the reference resistance and a second resistance relationship from the second measured resistance and
(Continued)

the reference resistance are determined. A measured temperature of the first battery cell is determined. A computed temperature of the second battery cell is determined based on the measured temperature of the first battery cell, the first resistance relationship, and the second resistance relationship according to a predetermined requirement.

10 Claims, 2 Drawing Sheets

(52) U.S. Cl.
CPC ... *B60L 2240/545* (2013.01); *B60L 2240/547* (2013.01); *H01M 2220/20* (2013.01)

(58) Field of Classification Search
CPC .......... H01M 2220/20; H01M 10/425; H01M 2010/4278; Y02E 60/10; Y02T 10/70; G01K 7/427
See application file for complete search history.

(56) References Cited

U.S. PATENT DOCUMENTS

| | | | |
|---|---|---|---|
| 2004/0253512 A1* | 12/2004 | Watanabe | H01M 4/131 429/185 |
| 2014/0372055 A1 | 12/2014 | Wang et al. | |
| 2015/0280294 A1* | 10/2015 | Shin | B60L 58/26 429/50 |
| 2017/0012327 A1 | 1/2017 | Mitsuyama et al. | |

FOREIGN PATENT DOCUMENTS

| | | |
|---|---|---|
| DE | 10 2011 116 779 A1 | 5/2012 |
| DE | 10 2013 103 921 A1 | 11/2013 |
| DE | 10 2016 111 547 A1 | 12/2016 |
| DE | 10 2017 218 715 A1 | 4/2019 |
| EP | 3 008 771 B1 | 4/2016 |

OTHER PUBLICATIONS

German-language German Office Action issued in German application No. 10 2020 003 887.5 dated Mar. 3, 2021 (Eight (8) pages).

\* cited by examiner

METHOD FOR DETERMINING THE RESPECTIVE TEMPERATURE OF SEVERAL BATTERY CELLS OF A VEHICLE BATTERY VIA EXTRAPOLATION OF A MEASURED TEMPERATURE; CONTROL DEVICE AND VEHICLE BATTERY

BACKGROUND AND SUMMARY OF THE INVENTION

The invention relates to a method for determining the respective temperature of several battery cells of a vehicle battery. A second aspect of the invention relates to a corresponding control device. A third aspect of the invention relates to a vehicle battery having the stated control device, among others.

Electric motor vehicles must be able to fulfil the high expectations and requirements that are already fulfilled by conventional fuel-powered vehicles with regards to lifespan, performance, range and safety for a successful commercialisation. Purely electric vehicles that only have an electrical energy storage and one or several electric motors, hybrid vehicles that have a combustion engine, an electrical energy storage and one or several electric motors, and hydrogen vehicles that, for example, have a fuel cell, an electrical energy storage and one or several electric motors, are examples of electric motor vehicles. An electrical energy storage of a motor vehicle can also be described as a vehicle battery and/or traction battery. A vehicle battery is composed of a plurality of battery cells that are interconnected among each other in series and/or in parallel. The plurality of battery cells is designed to save electrical energy collectively, or to collectively provide an electrical power. The battery cells of a vehicle battery can all be interconnected in series. It is advantageously provided, however, that several battery cells are interconnected with each other in series, and yield a group wherein several such groups are interconnected in parallel. The nominal voltage level of the vehicle battery results from the nominal voltage of the individual battery cells and the number of battery cells interconnected in series. The nominal voltage level is preferably at least 80 volts, preferably at least 200 volts, for example 400 volts or 800 volts.

It is in particular provided that the vehicle battery is continuously monitored in order to guarantee an efficient and safe operation of the vehicle battery or of the motor vehicle having the vehicle battery. Within the context of the monitoring, the respective temperature, voltage, current, state of charge (SoC) and/or the degree of wear or degradation (state of health, SoH) is checked, for example. Any combination of the variables given as examples is here possible. It is extremely advantageous to continuously check, or to determine and to monitor the respective temperature of each of the battery cells in an operation. This applies analogously to the degree of wear or the degradation (SoH).

The arrangement of a respective temperature sensor on each battery cell is here extremely complicated and cost intensive. Correlations between the given variables and the internal resistance of the respective battery cells are frequently utilised for this reason. The temperature and/or the degradation of the respective battery cell can in particular be determined from the internal resistance.

The internal resistance of a respective battery cell can for example be used by means of a current pulse measuring method that utilises a correlation of a voltage response to a current pulse. A low computational effort is necessary for this purpose. Values determined in this way can only be provided irregularly, however. An alternative method uses an adaptive model, for example a so-called electric circuit model (ECM). This relates in particular to a Kalman filter.

It is the object of the present invention to enable an improved monitoring of the temperature of respective battery cells of a vehicle battery.

A first aspect of the invention relates to the method for determining the respective temperature of several battery cells of a vehicle battery. In order to enable the improved monitoring of the respective temperature, the method has the following steps:

determination of measured values, comprising a first voltage of at least one first battery cell and a second voltage of at least one second battery cell and at least one respective current that flows through the battery cells, determination of a first measured resistance of the first battery cell and a second measured resistance of the second battery cell from the measured values, determination of a reference resistance, determination of a first resistance relationship from the first measured resistance and the reference resistance and of a second resistance relationship from the second measured resistance and the reference resistance, determination of a measured temperature of the first battery cell, determination of a computed temperature of the second battery cell by means of the measured temperature and the first resistance relationship and the second resistance relationship according to a predetermined requirement.

The determination of the measured values occurs in particular via a corresponding measurement by means of a measurement device. The measurement device can in particular be designed to measure the first voltage and/or the second voltage and/or the respective current. The respective current that flows through the first battery cell and the second battery cell is in particular the same current, as both battery cells are interconnected in series. The first measured resistance and the second measured resistance can be determined by means of the measured values. The determination of the first and second measured resistance occurs in particular by means of a mathematical correlation between current voltage and resistance. The determination of the first measured resistance of the first battery cell and the second measured resistance of the second battery cell from the measured values occurs by means of Ohm's law, for example. More complicated mathematical correlations can also be used in a further embodiment, as will further be shown in the further course of this application.

The reference resistance can be a predetermined value, for example. The determination of the reference resistance can occur in this case by requesting the predetermined value from a storage device. The reference resistance can alternatively be formed as an average value of all measured resistances of the several battery cells, for example the first measured resistance and the second measured resistance.

The determination of the reference resistance occurs in particular by means of averaging or forming the average of all measured resistances of all battery cells of the vehicle battery. The first and the second measured resistance relationship can be formed by dividing the respective measured resistance, and thus the first or the second measured resistance, by the reference resistance. The first or second reference resistance can alternatively be formed by distributing the reference resistance by the first or the second reference resistance.

The determination of the measured temperature of the first battery cell can occur by measuring the temperature of the first battery cell. The determination or measurement of the measured temperature in particular occurs by means of a temperature sensor. The temperature sensor can for example be formed as an NTC or PTC sensor, or comprise a sensor of this kind. A measurement by means of an infrared thermometer is alternatively also possible. Any other measuring method for measuring a temperature of the first battery cell is also conceivable. The measured temperature of the first battery cell can generally be determined by means of a temperature measuring unit.

The determination of the computed temperature occurs on the basis of the first resistance relationship und the second resistance relationship, and the measured temperature according to the predetermined requirement. The computed temperature here indicates the temperature of the second battery cell, while the measured temperature indicates the measured temperature of the first battery cell. The computed temperature is described as such as it is not measured, but is rather derived or determined from the given variables by means of the predetermined requirement.

The invention is based on the idea of extrapolating the temperature of the second battery cell from the temperature of the first battery cell. The measured temperature is compared with the first and the second resistance relationship for this extrapolation. The invention here takes advantage of the fact that the internal resistance of a respective battery cell decreases when the temperature of the corresponding battery cell increases. The temperature of the first battery cell can thus be extrapolated to the second battery cell based on the respective internal resistance, and thus on the first and second measured resistance of the first and second battery cell. Here it is in particular taken into account that there is no linear relationship between the temperature and the respective internal resistance. The relationship between respective internal resistance and temperature can be available via a distribution function and/or a corresponding value table, for example. The relationship, in particular the distribution function or the value table, can here be predetermined. The relationship, in particular the distribution function or the value table, is in particular derived via corresponding tests on a vehicle battery of this kind or corresponding battery cells. A numerical generation of the value table or the distribution function can here be provided. Overall, it is thus shown that an improved monitoring of the temperatures of respective battery cells of a vehicle battery can be enabled. In particular, only a low number of temperature measuring units or temperature sensors can be sufficient to determine the respective temperature of all battery cells via the method according to the invention. This saves complexity in the construction of the vehicle battery on the one hand, and costs on the other.

The method is generally also possible without the steps of determining the reference resistance and determining the first and second resistance relationship. In this case, the computed temperature could occur differently by means of the measured temperature, and the first measured resistance and the second measured resistance according to a corresponding predetermined requirement. Here it has proved to be the case, however, that the comparison with the reference resistance, also described as normalization, can deliver reliable results. This here in particular proceeds from the knowledge that the absolute resistances are not of interest, as the respective battery cell having the lowest internal resistance is usually also the warmest of the battery cells, and the battery cell having the highest internal resistance is usually the coolest of the battery cells. As the determination of the computed temperature also occurs independently of the measured temperature, the observation of the respective measured resistance normalized to the reference resistance, and thus to the first or second resistance relationship, is sufficient. A homogeneous database is obtained via normalization.

It is provided according to a development that the predetermined requirement contains the distribution function and/or the value table that assign a respective value, in particular exactly one respective value, for the temperature, and thus the computed temperature, to a plurality of values for the second resistance relationship, depending on the measured temperature and the first resistance relationship. It can here be provided that the distribution function and/or the value table are generated via the corresponding tests or measurements on the vehicle battery. The value table or the distribution function can be provided via a mathematical relationship or a mathematical formula, or numerically. The value table and/or the distribution function can additionally have the discharge state of the vehicle battery and/or the respective battery cell as parameters. In other words, the respective relevant distribution function and/or value table can be consulted for different values of the state of charge of the vehicle battery and/or the respective battery cell. In this case, the method can contain the determination of a state of charge of the vehicle battery and/or the respective battery cell as an additional step. An even more precise determination of the temperature, in particular computed temperature of the second battery cell, can be obtained in this way.

It is provided according to a development that the distribution function and/or value table is first normalized depending on the first resistance relationship and the measured temperature, and the computed temperature is then derived from the normalized distribution function and/or value table depending on the second resistance relationship. In other words, first the distribution function and/or value table is selected or generated by means of the data of the first battery cell, and thus the first resistance relationship and the measured temperature, and then the computed temperature is selected from the distribution function and/or value table generated in this way, depending on the second resistance relationship. The normalized distribution function and/or value table can here indicate a one-to-one relationship between computed temperature and second resistance relationship. In this way, it is possible to easily derive the computed temperature by means of the normalized distribution function and/or value table. The normalization or generation or selection of the normalized distribution function and/or value table can occur in particular on the basis of predetermined data.

It is provided according to a development that a respective second resistance relationship for several second battery cells is determined, from which, and by means of the predetermined requirement, the measured temperature and the first resistance relationship, a respective value for the computed temperature of the respective second battery cell is determined. In other words, the determination of the computed temperature of the second battery cell occurs in an analogue manner for several second battery cells in parallel. The respective second resistance relationship can here be used as the basis for each of the second battery cells, the second resistance relationship being derived from a respective measured resistance that is determined for the respective second battery cell. A respective second voltage can be determined for each of the second battery cells to determine the respective second measured resistance. A respective current can be determined for each of the second battery cells, wherein the respective current can be the same for all second battery cells in the event of an interconnection in series. The respective computed temperature of the respective second battery cell is here determined in each case on the basis of the first resistance relationship of the first battery cell and the measured temperature of the first battery cell. In other words, the computed temperature of each of the second battery cells is extrapolated on the basis of the measured temperature of the first battery cell and its resistance or resistance relationship. In this way, a plurality of temperature sensors is not required, as a temperature sensor is no longer needed for each of the second battery cells.

It is provided according to a development that a respective measured temperature and a respective first resistance relationship is determined for several first battery cells, from which, and by means of the predetermined requirement and the second resistance relationship, a respective value for the computed temperature of the second battery cell is determined. In other words, the computed temperature of the second battery cell is extrapolated on the basis of the respective measured temperature and the respective first resistance relationship of several first battery cells. The determination or extrapolation of the computed temperature occurs in particular on the basis of the different battery cells independently of each other. In a further embodiment, it can be provided that the several values for the computed temperature of the second battery cell are averaged. Outliers, and thus values for the computed temperature of the second battery cell that deviate from the usual values by more than a predetermined amount, can be filtered out before this averaging occurs. This is because values deviating significantly in this way or outliers are probably due to errors in the measuring or errors in the determination of the computed temperature. In this way, the precision in the determination of the respective temperature of the battery cells can be further improved.

It is provided according to a development that at least one measured temperature of one of the several first battery cells arranged on the edge of the vehicle battery and at least one measured temperature of one of the several first battery cells arranged in the center of the vehicle battery is determined. In other words, a respective temperature sensor or a respective temperature measuring unit is arranged on at least one first battery cell that is arranged on the edge of the vehicle battery, and at least one temperature sensor or temperature measuring unit is arranged on a first battery cell that is arranged in the middle of the vehicle battery. The first battery cell arranged on the edge of the vehicle battery is only next to one further battery cell, for example. The first battery cell arranged in the middle of the vehicle battery is next to a respective further battery cell on several sides, for example. In this way, different temperature measured values for different installation situations of the different first battery cells result. This enables an even more precise determination of the measured temperature, and thus also of the computed temperature or the several computed temperatures derived from it.

It is provided according to a development that it is checked whether a reference state is present, wherein a correlation coefficient G is greater than a predetermined value and/or respective measured temperatures of several first battery cells among themselves do not exceed a predetermined measurement in the reference state. The correlation coefficient G applies in particular to the quality of a regression of the determination of the respective measured resistances. The correlation coefficient G here represents in particular a quality factor that characterises the data quality of the measured values or resistance values derived from them. The reference state is here in particular a static state in which the vehicle battery is in a static state. The determination of the respective temperature of the several battery cells is not required in the reference state, or exactly when the reference state is present, as it can be assumed that these develop in a temporally constant manner. In addition, other evaluations can be made exactly when the reference state is present. A quantification of the degradation or a change of the degradation of the vehicle battery in comparison with earlier reference states occurs in particular. This proceeds from the knowledge that slow or long-term behaviour of the measured value is not caused by a change of the temperature of the battery cells, but by a change of their degradation. The change of the state of the vehicle battery or individual cells or their degradation can thus be determined from this long-term behaviour.

A second aspect of the invention relates to a control device for determining the respective temperature of several battery cells of a vehicle battery, wherein the control device is designed to:
receive measured values, comprising a first voltage of at least one first battery cell and second voltage of at least one second battery cell and at least one respective current that flows through the battery cells,
determine a first measured resistance of the first battery cell and a second measured resistance of the second battery cell from the measured values,
determine a reference resistance,
determine a first resistance relationship from the first measured resistance and the reference resistance, and a second resistance relationship from the second measured resistance and the reference resistance,
receive a measured temperature of the first battery cell, and
determine a computed temperature of the second battery cell by means of the measured temperature and the first resistance relationship and the second resistance relationship according to a predetermined requirement.

The control device is in particular designed to carry out the method according to the invention according to one or several of the embodiments described here. The control device comprises a computing unit, for example, the computing unit being formed as a microcontroller, field programmable gate array (FPGA) or digital signal processor (DSP). The control device or the computing unit can have a memory unit, for example a flash memory, a magnetic memory medium, and/or an optical memory medium or the like, in which a computer program product is saved that contains program coding means to carry out the method according to the invention or individual method steps of the method according to the invention. The program coding means in particular provide for the execution of the method according to the invention according to one or several embodiments when executed on the control device or the computing device.

A third aspect of the invention relates to the vehicle battery having:
the control device mentioned above,
at least one first battery cell and a respective temperature measuring unit for determining the respective measured temperature of each first battery cell,
at least one second battery cell, and a measuring device for determining measured values, [comprising] a first voltage of a first battery cell and second voltage of a second battery cell, and at least one respective current that flows through the battery cells.

The vehicle battery can be executed as a lithium-ion battery, for example. The vehicle battery can have a voltage level of more than 80 volts, preferably more than 200 volts, for example 400 volts or 800 volts. The vehicle battery in particular has several temperature measuring units, for example two, three or four. In this case, four battery cells of the vehicle battery are first battery cells in the sense of the present application. The respective temperature of the remaining battery cells of the vehicle battery, the battery cells also being able to be described as second battery cells in the sense of the present application, is extrapolated by means of the respective measured temperatures of the first battery cells or the one first battery cell.

Further advantages, features and details of the invention result from the following description of preferred exemplary embodiments and with reference to the drawings. The features and combinations of features previously given in the description, and the features and combinations of features given in the following description of figures and/or shown solely in the figures can be used not only in the respectively given combination, but also in other combinations or in isolation without leaving the scope of the invention.

DETAILED DESCRIPTION OF THE DRAWINGS

Figure 1:
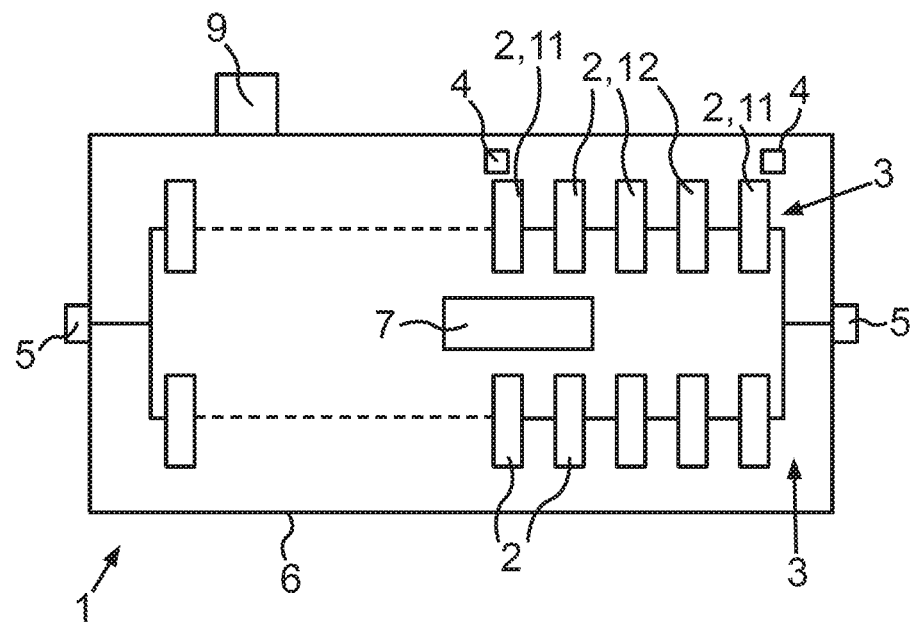
FIG. 1 shows a schematic block diagram of a vehicle battery having several battery cells, wherein some of the battery cells have a respective temperature sensor, and the temperature of the remaining battery cells is extrapolated by means of the measured temperatures and respective resistances of the battery cells.

FIG. 1 shows a vehicle battery 1 having a plurality of battery cells 2 according to an extremely exemplary embodiment. The battery cells 2 are divided into two groups 3, wherein the battery cells 2 of a respective group 3 are respectively interconnected in series. The groups 3 are interconnected with each other in parallel in turn. Every other reasonable interconnection of the battery cells 2 is of course also possible. The vehicle battery 1 is in particular formed as a so-called traction battery to provide an electric drive of a motor vehicle having electrical energy to drive or accelerate a motor vehicle. The vehicle battery 1 or its battery cells 2 are in particular based on the technology of a lithium-ion battery.

The vehicle battery 1 has electrical ports 5 to which an output voltage of the vehicle battery 1 is applied. A load, in particular an inverter for operating an electric machine of a motor vehicle and/or a voltage transformer for providing an on-board power supply of the motor vehicle with electrical energy can in particular be applied to the electrical ports 5. In other words, the vehicle battery 1 can emit electrical energy or an electrical power outwards via the electrical ports 5. The electrical ports 5 for providing the electrical power can be the only power requirements that are led out of a battery housing 6 of the vehicle battery 1. The electrical ports 5 can be provided by two poles in total. The output voltage of the vehicle battery 1 is nominally in particular more than 80 V, preferably more than 200 V, for example 400 V or 800 V. The number of battery cells 2 interconnected in series also derives from the desired nominal voltage level of the output voltage when lithium-ion based battery cells 2 are used.

A monitoring of the vehicle battery 1 that is as comprehensive as possible is necessary in order to be able to guarantee a high degree of safety during the operation of the vehicle battery 1 and to maximise a lifespan of the vehicle battery 1. The monitoring can for example relate to the output voltage, a current flow, a temperature, a state of charge (SOC), a degradation (SOH) or the like. It is particularly preferred if this monitoring occurs not only in relation to the entire vehicle battery 1, but at least partially for each of the battery cells 2 individually. In this way, damage to individual battery cells 2 can be recognised or prevented.

The vehicle battery 1 has several temperature measuring units 4. The temperature measuring units 4 are assigned to a respective battery cell 2. The temperature measuring units 4 are here designed to measure the temperature of the respective battery cells 2. The battery cells 2 to which a temperature measuring unit 4 is assigned are also described as first battery cells 11. It is obvious that a temperature measuring unit 4 is only assigned to a fraction of the battery cells 2. The battery cells 2 to which no temperature measuring unit 4 is assigned are also described as second battery cells 12. Only a few temperature measuring units 4 are provided, in order to keep a complexity and production costs of a vehicle battery 1 as low as possible. On the other hand, it is desirable to determine the respective temperature of all the battery cells 2. For this reason, the measured temperature of the first battery cells 11 is extrapolated to the second battery cells via a method for determining the respective temperature of battery cells of the vehicle battery 1. The vehicle battery 1 can have a corresponding control device 9 to carry out this method.

Figure 2:
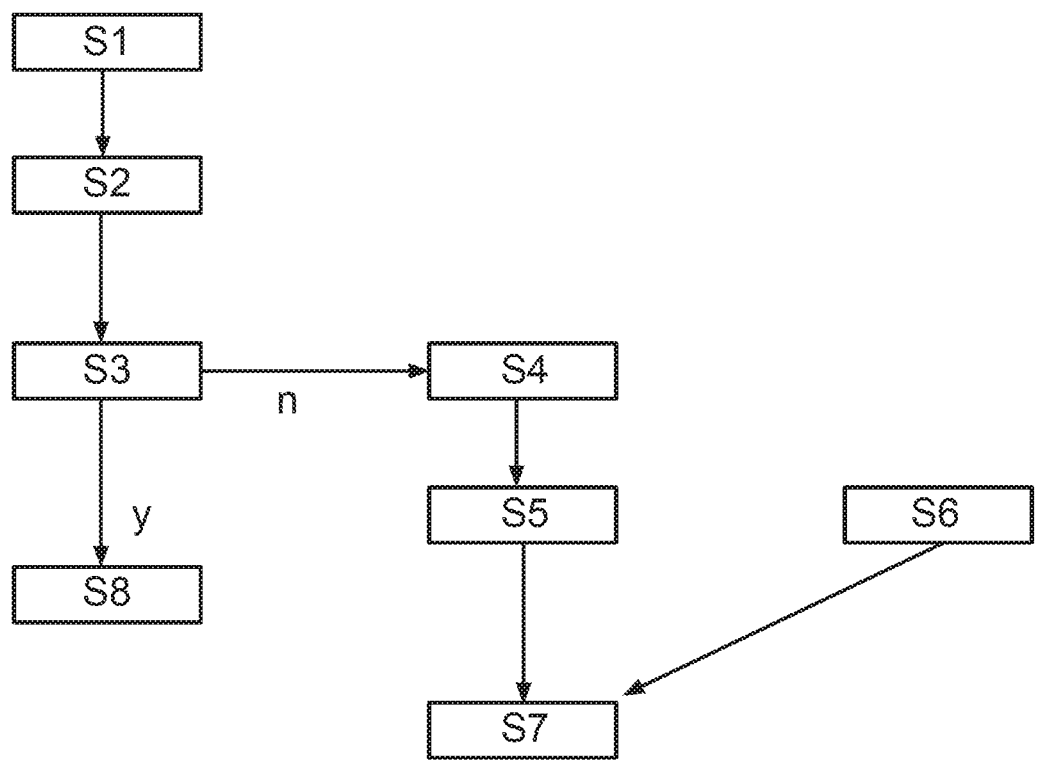
FIG. 2 shows an exemplary method sequence with reference to a process diagram.

The vehicle battery 1 presently has a measuring device 7 that is designed to measure or determine current and voltage of the individual battery cells 2. Here it can in particular be provided that a respective voltage for each of the battery cells 2 is measured or determined. It can be provided that the current for each of the battery cells 2 is measured independently of each other. The current is preferably measured or determined for several battery cells 2 together, however. The respective current that flows through the battery cells 2 interconnected in series, presently the battery cells 2 of a group 3, is respectively the same due to the series interconnection of several battery cells 2. In this way, the current can respectively only be measured once for each of the groups 3. The entire current of all the groups 3 can alternatively be measured and distributed over the number of the groups 3, this occurs in particular under the assumption that the entire current is equally distributed over all the groups 3. According to a further alternative, the current of a group 3 can be measured and it can be assumed that the current of the other groups 3 corresponds to this current. The measurement of the given measured value corresponds to a step S1 in relation to the process diagram according to FIG. 2. The measured values are alternatively or additionally received via the control device 9 in the step S1.

A respective resistance, also a measured resistance, can be determined for each of the battery cells 2 from the given measured values, and thus the respective values for current and voltage. This can occur based on Ohm's law, for example. This occurs in other exemplary embodiments according to different formalistic approaches that are described subsequently in more detail. This determination of the respective resistances or internal resistances of the individual battery cells 2 corresponds to a step S2.

It is determined in a step S3 whether a reference state or a so-called "steady state" is present. The respective temperature of the first battery cells 11 differs from one another at most by a predetermined amount in the present embodiment in this reference state. A correlation coefficient G is also greater than a predetermined value in the present embodiment in the reference state. The correlation coefficient G is described in more detail in the following (see also formula (22)). If a reference state of this kind is present, the method for determining the respective temperature is halted or carried out in a different manner. In this case, the temperature of the second battery cells 12 is not determined, this corresponds to the path "n" in the process diagram, but rather the degradation ("state of health") of the battery is determined, which corresponds to the path "y" in FIG. 2.

In a further step S6, the temperature values are requested or received from the temperature measuring units 4. This occurs in particular via the control device 9. The measurement of the temperature values can also alternatively or additionally occur in the step S6 via the temperature measuring units 4. The step S6 can be carried out repeatedly and/or be carried out before the step S3, such that the temperature values for the step S3 are respectively provided in current form.

If no reference state is present, then the method can be resumed with a step S4. In a step S4, a reference resistance is determined. This reference resistance can for example be a predetermined value that is requested during the step S4 from a memory unit of the control device 9. In the present exemplary embodiment, the reference resistance is determined from the internal resistances or measured resistances of all the battery cells 2. The reference resistance is in particular determined via averaging of the same. In other words, the reference resistance can be the average of the internal resistances or measured resistances.

A respective resistance relationship is determined for each of the internal resistances of the battery cells 2 in the step S5. This respective resistance relationship is calculated by dividing the respective internal resistance or measured resistance by the reference resistance. The respective resistance relationship can alternatively be calculated by dividing the reference resistance by the respective internal resistance or measured resistance.

The actual extrapolation of the measured temperatures or temperature values in relation to the first battery cells 2 occurs in the method step S7. A respective computed temperature of all the second battery cells 12 is here determined on the basis of the measured temperatures via the respective resistance relationships. The basis of the computed temperature can here be a predetermined requirement. The predetermined requirement in particular connects the respective temperatures of the battery cells 2 to the respective resistance relationship. The predetermined requirement can here contain a value table and/or a distribution function 15. The value table and/or distribution function 15 can be derived in particular from corresponding laboratory tests. The results of the corresponding laboratory tests can be numerically contained in the value table and/or distribution function, or can be emulated via a mathematical function.

Figure 3:
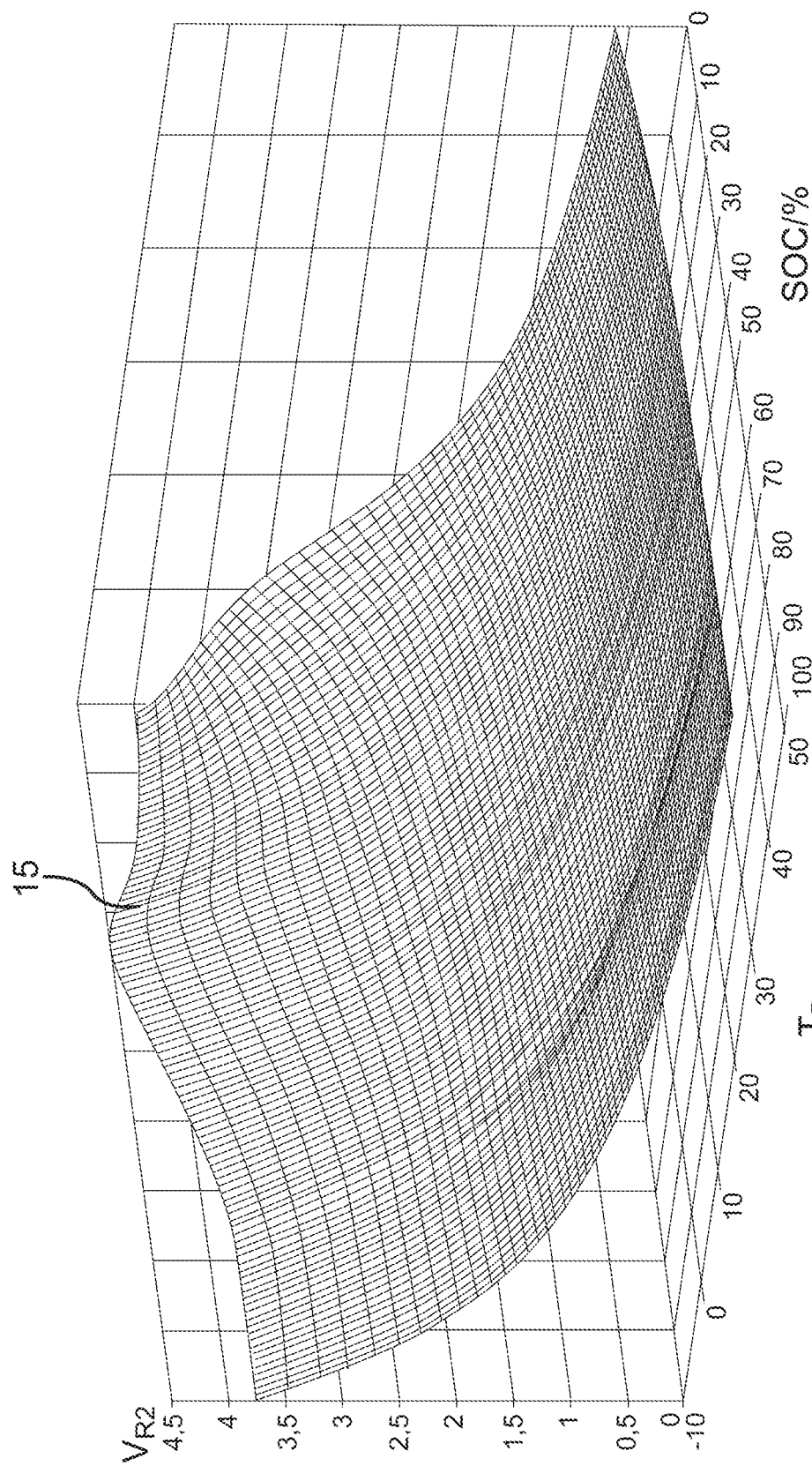
FIG. 3 shows an exemplary experimentally provided distribution function.

FIG. 3 shows an exemplary distribution function 15 that specifies the temperature $T_R$ of a respective second battery cell 12, depending on the respective resistance relationship $V_{R2}$ of the corresponding second battery cells 12 and the state of charge SOC. The exemplary distribution function 15 is here generated as a parameter on the basis of the first resistance relationship and the measured temperature of a respective first battery cell 11. In other words, a distribution function 15 based on the measured temperature and a first resistance relationship of a respective first battery cell 11 is generated, in order to derive the temperature $T_R$ of a respective second battery cell 12 from the distribution function, depending on its resistance relationship $V_{R2}$ and state of charge SOC. In a further embodiment, this can occur for each second battery cell 12 independently of each other on the basis of each first battery cell 11. In this way, as many computed temperatures are obtained for each battery cell 12 as first battery cells 11 or temperature measuring units 4 are present. An averaging of these several computed temperatures of each battery cell 12 can occur. In a further embodiment, a sorting out of outliers or significantly deviating values can occur before this averaging. A particularly precise determination of the computed temperature results in this way.

The mathematical basis of the present invention will now be described in more detail in the following.

A. Algorithm to Determine the Resistance

The basis for the determination or calculation of the respective internal resistance is a sub-division of the course of the measured variables (current and voltage) into an instant system response $I(t) \cdot R_{Ohm}(t)$ and a delayed system response $\mathcal{F}(t)$.

$$U(t) = I(t) \cdot R_{Ohm}(t) + \mathcal{F}(t). \tag{1}$$

The instant system response is described via the voltage on the ohmic resistance $R_{Ohm}(t)$ due to the current $I(t)$. The delayed system response $\mathcal{F}(t)$ is in turn sub-divided into a deterministic ratio $\mathcal{F}_{deter}$ and a stochastic noise ratio $\mathcal{F}_{stoch}$ $$\mathcal{F}(t) = \mathcal{F}_{deter}(t) + \mathcal{F}_{stoch}(t) \tag{2}$$

The delayed deterministic cell behaviour can be expressed by using an electric circuit model (ECM) having two resistance pairs.

$$\mathcal{F}_{deter}(t) = OCV(t) + U_{Pol}(t) + U_{Diff}(t),$$

$$\frac{dU_{Pol}(t)}{dt} = -\frac{1}{R_{Pol} \cdot C_{Pol}} \cdot U_{Pol}(t) + \frac{I(t)}{C_{Pol}},$$

$$\frac{dU_{Diff}(t)}{dt} = -\frac{1}{R_{Diff} \cdot C_{Diff}} \cdot U_{Diff}(t) + \frac{I(t)}{C_{Diff}},$$

$$\frac{dSoC(t)}{dt} = \frac{I(t)}{C_N}.$$

The stochastic noise can be expressed via an independent Gaussian noise method having a mean average value of zero.

$$\mathcal{F}_{stoch}(t) = \mathcal{N}(0, \sigma_{noise}^2) \tag{7}$$

The values of the ECM parameters $R_{Ohm}$, $R_{Pol}$, $R_{Diff}$, $C_{Pol}$, $C_{Diff}$ and $C_N$ change over time depending on operating conditions and cell states. The requirements of the usage of stochastic methods require the voltage and current signals to be discretised into sample values. The sample size n and the sample rate $T_s$ must fulfil two requirements. On the one hand, the sampling size n must be large enough to fulfil the stochastic measures with a high level of confidence, while, on the other hand, the ohmic resistance $R_{Ohm}(t)$ and the deterministic system behaviour in the temporal interval of the sample must not be changeable $\Delta t = n \cdot T_s$.

On the basis of these requirements, the entire difference of the ohmic resistance $$\Delta R_{Ohm}(t) = \left.\frac{\partial R_{Ohm}}{\partial t}\right|_{T_s} \Delta t + \left.\frac{\partial R_{Ohm}}{\partial T} \cdot \frac{\partial T}{\partial t}\right|_{T_s} \Delta t + \ldots + \\ \left.\frac{\partial R_{Ohm}}{\partial SoC} \cdot \frac{\partial SoC}{\partial t}\right|_{T_s} \Delta t + \left.\frac{\partial R_{Ohm}}{\partial I} \cdot \frac{\partial I}{\partial t}\right|_{T_s} \Delta t \approx 0, \quad (8)$$

must be negligibly small in the sample interval $\Delta t$. The entire difference of the delayed system reaction leads to the following equations $$\Delta \mathcal{F}(t) = \Delta OCV(t) + \Delta U_{Pol}(t) + \Delta U_{Diff}(t) + \Delta \mathcal{F}_{stoch} \quad (9)$$

Under the condition that the alteration of the OCV $$\Delta OCV(t) = \left.\frac{\partial OCV}{\partial t}\right|_{T_s} \Delta t + \left.\frac{\partial OCV}{\partial T} \cdot \frac{\partial T}{\partial t}\right|_{T_s} \Delta t + \ldots + \\ \left.\frac{\partial OCV}{\partial SoC} \cdot \frac{\partial SoC}{\partial t}\right|_{T_s} \Delta t + \ldots \approx 0, \quad (10)$$

is negated at relevant intervals. Due to the high temporal constants of the diffusion process $$T_S \ll R_{Diff} \cdot C_{Diff} \quad (11)$$

the second RC pair $$\Delta U_{Diff}(t) = \left.\frac{\partial U_{Diff}}{\partial t}\right|_{T_s} \Delta t + \left.\frac{\partial U_{Diff}}{\partial T} \cdot \frac{\partial T}{\partial t}\right|_{T_s} \Delta t + \ldots + \\ \left.\frac{\partial U_{Diff}}{\partial SoC} \cdot \frac{\partial SoC}{\partial t}\right|_{T_s} \Delta t + \ldots \approx 0, \quad (12)$$

can also be negated. Due to the low temporal constant, the entire change of the first RC pair $$T_S > R_{Pol} \cdot C_{Pol} \quad (13)$$

in further temperature and SoC (state of charge) regions $$\Delta U_{Pol}(t) = \left.\frac{\partial U_{Pol}}{\partial t}\right|_{T_s} \Delta t + \left.\frac{\partial U_{Pol}}{\partial T} \cdot \frac{\partial T}{\partial t}\right|_{T_s} \Delta t + \ldots + \\ \left.\frac{\partial U_{Pol}}{\partial SoC} \cdot \frac{\partial SoC}{\partial t}\right|_{T_s} \Delta t + \ldots \neq 0 \quad (14)$$

cannot be negated. The change of the stochastic measuring noise cannot be negated. The entire difference of the delayed system response leads to results $$\Delta \mathcal{F}(t) = \Delta U_{Pol}(t)|_{T_S > R_{Pol} \cdot C_{Pol}} + \Delta \mathcal{F}_{stoch}. \quad (15)$$

via usage of the backwards differences of the discrete voltage signals.

$$\delta U(t) = U(t) - U(t - T_S) = \delta I(t) \cdot R_{Ohm}(t) + \delta \mathcal{F}(t) \quad (16)$$

For an improved overview, the discrete signals are combined into a vector $$\delta \vec{U}(t) = [\delta U(t) \; \delta U(t + T_S) \; \ldots \; \delta U(t + n \cdot T_S)]^T \quad (17)$$

having the length of the sampling size n that in particular corresponds to the number of battery cells 2. The system equation can now be written in a vector notation $$\delta \vec{U}(t) = R_{Ohm}(t) \cdot \delta \vec{I}(t) + \delta \vec{\mathcal{F}}(t) \quad (18)$$

One possible way of determining the ohmic resistance is therefore to apply the covariance of the voltage vector to the current vector $$\frac{\mathrm{Cov}(\delta \vec{U}(t), \delta \vec{I}(t))}{\mathbb{V}(\delta I(t))} = R_{Ohm}(t) + \frac{\mathrm{Cov}(\delta \vec{\mathcal{F}}(t), \delta \vec{I}(t))}{\mathbb{V}(\delta \vec{I}(t))} \quad (19)$$

on the condition that the present current vector is constant, and the variance of the present current vector is equal to zero. The second term of equation 19 can be approximated by means of the equations (9)-(15):

$$\frac{\mathrm{Cov}(\delta \vec{\mathcal{F}}(t), \delta \vec{I}(t))}{\mathbb{V}(\delta \vec{I}(t))} \approx R_{Pol}(t)|_{T_S > R_{Pol} \cdot C_{Pol}} \quad (20)$$

The covariance of cell voltage and cell current can be approximated as follows, $$\frac{\mathrm{Cov}(\delta \vec{U}(t), \delta \vec{I}(t))}{\mathbb{V}(\delta \vec{I}(t))} \approx R_{Ohm}(t) + R_{Pol}(t)|_{T_S > R_{Pol} \cdot C_{Pol}} \equiv R_I(t) \quad (21)$$

which is defined as an internal resistance $R_I(t)$ of the respective battery cell 2. Applying the regression method to real data requires filter techniques, as real profiles contain phases in which the current is constant or zero. Using the least squares method, the correlation coefficient for evaluating the quality of a regression is $$G(t) = \frac{\text{Cov}(\delta \vec{U}(t), \delta \vec{I}(t))}{\sqrt{\mathbb{V}(\delta \vec{I}(t)) \cdot \mathbb{V}(\delta \vec{U}(t))}} = R_I(t) \cdot \sqrt{\frac{\mathbb{V}(\delta \vec{I}(t))}{\mathbb{V}(\delta \vec{U}(t))}}.$$ (22)

as a quality factor G on the basis of the database of each sample for evaluating the assessment. This application comprises two different techniques of the regression method. One method requires a data backup of the respective sample in order to analytically calculate the covariance and the correlation coefficient. The other algorithm approximates the covariance and the correlation coefficient while avoiding the need for an interim storage. The two algorithms are completely described in the following, including filters used, starting values and definitions.

B. Summary of the Regression Method Having Data Backup (RM)

Notation and Definitions:

sample vector $\vec{x}_k = [x_k \; x_{k+1} \; x_{k+2} \; \ldots \; x_{k+n_{opt}}]^T$ for the current $\delta \vec{I}_k = \vec{I}_k - \vec{I}_{k-1}$ for the voltage $\delta \vec{U}_k = \vec{U}_k - \vec{U}_{k-1}$ having the optimised sample size $n_{opt}$=length $(\delta \vec{I}_k)$=length $(\delta \vec{I}_k)$ Initialization: k=0

$$R^*_{I,0} = 0$$

Calculation: k=0

$$R_{I,k} = \frac{\text{Cov}(\delta \vec{I}_k, \delta \vec{U}_k)}{\mathbb{V}(\delta \vec{I}_k)}$$

$$G_k = \frac{\text{Cov}(\delta \vec{I}_k(t), \delta \vec{U}_k)}{\sqrt{\mathbb{V}(\delta \vec{I}_k) \cdot \mathbb{V}(\delta \vec{U}_k)}} = R_{I,k} \cdot \sqrt{\frac{\mathbb{V}(\delta \vec{I}_k)}{\mathbb{V}(\delta \vec{U}_k)}}$$

$$R_{I,k} = \begin{cases} R_{I,k}, & \text{if } \mathbb{V}(\delta \vec{I}_k) \neq 0 \cap R_{I,k} \in \mathbb{R}^+ \cap R_{I,k} < \epsilon \\ R_{I,k-1}, & \text{else} \end{cases}$$

$$R^*_{I,k} = (1 - \tau) \cdot R^*_{I,k-1} + \tau \cdot R_{I,k}$$

C. Summary of the Recursive Regression Method (RRM)

Definitions $$\vec{\delta d}_k = [I_k \; U_k]^T - [I_{k-1} \; U_{k-1}]^T$$

Initialization: k=0

$$R^*_{I,0} = 0,$$
$$\vec{\mu}_0 = [0 \; 0]^T,$$
$$C_0 = \vec{\mu}_0 \otimes \vec{\mu}_0,$$

Calculation of the Output State: $0 \leq k < n_{opt}$ $$C_{k+1} = (1 - \lambda) \cdot \left(C_k + \lambda \cdot (\vec{\delta d}_{k+1} - \vec{\mu}_k) \otimes (\vec{\delta d}_{k+1} - \vec{\mu}_k)\right),$$

$$\vec{\mu}_{k+1} = (1 - \lambda) \cdot \vec{\mu}_k + \lambda \cdot \vec{\delta d}_{k+1}.$$

Calculation for: $k \geq n_{opt}$ $$R_{I,k} = \frac{C_k(1,2)}{C_k(1,1)}$$

$$G_k = \frac{C_k(1,2)}{\sqrt{C_k(1,1) \cdot C_k(2,2)}} = R_{I,k} \cdot \sqrt{\frac{C_k(1,1)}{C_k(2,2)}}$$

$$R_{I,k} = \begin{cases} R_{I,k}, & \text{if } C_k(1,1) \neq 0 \cap R_{I,k} \in \mathbb{R}^+ \cap R_{I,k} < \epsilon \\ R_{I,k-1}, & \text{else} \end{cases}$$

$$R^*_{I,k} = (1 - |\tau|) \cdot R^*_{I,k-1} + \tau \cdot R_{I,k}$$

$$C_{k+1} = (1 - \lambda) \cdot \left(C_k + \lambda \cdot (\vec{\delta d}_{k+1} - \vec{\mu}_k) \otimes (\vec{\delta d}_{k+1} - \vec{\mu}_k)\right).$$

$$\vec{\mu}_{k+1} = (1 - \lambda) \cdot \vec{\mu}_k + \lambda \cdot \vec{\delta d}_{k+1},$$

D. Degradation (SoH) and Temperature Estimation

The output of the described data-based algorithms leads to a resistance distribution $\overrightarrow{R_{I,k}}$ of the lithium-ion cells within the vehicle battery 1. This distribution is comprised of degradation (SoH) and temperature gradients, and tolerances in cell production and module design. In order to differentiate between these origins, a reference distribution $$\overrightarrow{N_{Ref,j}} = \overrightarrow{R_{I,k,j}} \cdot /\overrightarrow{R_{I,k,j}}$$ (23)

is offset in a relaxed state. The index j represents the respective cycle. Short-term changes of this reference distribution $$\overrightarrow{\mathcal{RR}} = \overrightarrow{N_j} \cdot /\overrightarrow{N_{Ref,j}}$$ (24)

can be based on temperature gradients within the battery. Long-term shifts between the following reference distributions $$\overrightarrow{\mathcal{RR}} = \overrightarrow{N_{Ref,j}} \cdot /\overrightarrow{N_{Ref,j-1}}$$

describe a rate of aging gradient that has an influence on the degradation or the SoH.

LIST OF REFERENCE CHARACTERS 1 vehicle battery
2 battery cell
3 group
4 temperature measuring unit
5 ports
6 battery housing
7 measuring unit
9 control device
11 first battery cell 12 second battery cell
15 distribution function

The invention claimed is:

1. A method for operating a temperature monitoring system to determine respective temperatures of battery cells of a vehicle battery, wherein the vehicle battery includes a set of first battery cells and a set of second battery cells, wherein the temperature monitoring system comprises: a control unit, a measuring device, and one or more temperature monitoring units, wherein each first battery cell is and each second battery cell is not associated with a respective temperature monitoring unit, the method comprising the steps of:
   measuring, via the measuring device, a first voltage of each first battery cell, a second voltage of each second battery cell, and at least one respective current through the first battery cells and the second battery cells;
   determining, via the control unit, a first resistance of the first battery cells and a second resistance of the second battery cells from the first voltages and the second voltages;
   determining, via the control unit, a first resistance relationship from the first resistance and a reference resistance, and a second resistance relationship from the second resistance and the reference resistance;
   measuring, via the temperature monitoring unit, a temperature of each first battery cell; and
   determining, via the control unit, a computed temperature of each second battery cell from the temperatures of the first battery cells, the first resistance relationship and the second resistance relationship, according to a predetermined requirement.

2. The method of claim 1, wherein the reference resistance is an average value of the first resistance and the second resistance.

3. The method of claim 1, wherein the predetermined requirement contains a distribution function and/or a value table that assigns exactly one respective value for the computed temperatures to a plurality of values for the second resistance relationship depending on the temperatures of the first battery cells and the first resistance relationship.

4. The method of claim 3, wherein the distribution function and/or the value table is first normalized depending on the first resistance relationship and the temperatures of the first battery cells and the computed temperatures are then derived from the normalized distribution function and/or the value table depending on the second resistance relationship.

5. The method of claim 1, wherein the set of second battery cells comprises a plurality of second battery cells.

6. The method of claim 1, wherein the set of first battery cells comprises a plurality of first battery cells.

7. The method of claim 6, wherein at least one measured temperature of first battery cells disposed on an edge of the vehicle battery and at least one measured temperature of first battery cells disposed in a center of the vehicle battery is determined.

8. The method of claim 1, further comprising:
   checking whether a reference state is present, wherein a correlation coefficient is greater than a determined value and/or respective measured temperatures of the first battery cells do not exceed a determined measure in the reference state.

9. An apparatus for determining respective temperatures of battery cells of a vehicle battery that includes a set of first battery cells and a set of second battery cells, the apparatus comprising:
   a measuring device configured to measure a first voltage of each first battery cell, a second voltage of each second battery cell, and at least one respective current through the first battery cells and the second battery cells;
   one or more temperature monitoring units configured to measure respective temperatures of each first battery cell, wherein each first battery cell is and each second battery cell is not associated with a respective temperature monitoring unit; and
   a control device, wherein the control device is configured to:
      determine a first resistance of the first battery cells and a second resistance of the second battery cells from the first voltages and the second voltages;
      determine a first resistance relationship from the first resistance and a reference resistance, and a second resistance relationship from the second resistance and the reference resistance; and
      determine a computed temperature of each second battery cell from the temperatures of the first battery cells, the first resistance relationship, and the second resistance relationship, according to a predetermined requirement.

10. A vehicle battery, comprising:
a set of first battery cells and a set of second battery cells; and
the apparatus of claim 9.

* * * * *